(12) United States Patent
Deng et al.

(10) Patent No.: US 11,397,147 B2
(45) Date of Patent: Jul. 26, 2022

(54) TEST DEVICE AND METHOD FOR TOP-OF-THE-LINE CORROSION OF HIGH-TEMPERATURE HIGH-PRESSURE WET GAS PIPELINE

(71) Applicant: SOUTHWEST PETROLEUM UNIVERSITY, Chengdu (CN)

(72) Inventors: Kuanhai Deng, Chengdu (CN); Yuanhua Lin, Chengdu (CN); Yue Yuan, Chengdu (CN); Guoliang Zhang, Chengdu (CN); Zhiping Yin, Chengdu (CN); Dezhi Zeng, Chengdu (CN); Wanying Liu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 443 days.

(21) Appl. No.: 16/736,975

(22) Filed: Jan. 8, 2020

(65) Prior Publication Data
US 2020/0292440 A1    Sep. 17, 2020

(30) Foreign Application Priority Data
Mar. 15, 2019  (CN) .......................... 201910199315.6

(51) Int. Cl.
*G01N 17/00*    (2006.01)
*G01N 17/04*    (2006.01)

(52) U.S. Cl.
CPC ......... *G01N 17/006* (2013.01); *G01N 17/002* (2013.01); *G01N 17/043* (2013.01)

(58) Field of Classification Search
CPC .... G01N 17/00; G01N 17/002; G01N 17/006; G01N 17/043; G01N 2203/024
See application file for complete search history.

(56) References Cited

U.S. PATENT DOCUMENTS

| | | | | |
|---|---|---|---|---|
| 4,335,072 A | * | 6/1982 | Barnett .................. | G01N 17/00 422/53 |
| 2010/0147056 A1 | * | 6/2010 | Stolle ..................... | G01N 25/56 73/86 |

FOREIGN PATENT DOCUMENTS

| CN | 110243754 A | * | 9/2019 |
|---|---|---|---|
| CN | 110243755 A | * | 9/2019 |

* cited by examiner

*Primary Examiner* — Natalie Huls
(74) *Attorney, Agent, or Firm* — Oliff PLC

(57) ABSTRACT

A test device and method for top-of-the-line corrosion (TLC) of a high-temperature high-pressure wet gas pipeline. The device mainly includes: a metal top cap, a metal reaction cylinder, a first thermometer, a second thermometer, a plastic transparent measuring cylinder, a condensed water collection tube, an atomic spectrometer, a third thermometer, a rubber seal cover, a condensate droplet, a threaded hole, a condensation chamber, a pipeline sample, a temperature measuring hole, and a 30-degree tilt angle. The device and method can effectively simulate TLC of a wet gas pipeline under a high-temperature high-pressure environment. The device and method can test the high-temperature high-pressure TLC of the wet gas pipeline under different temperature differences (between a surface temperature of the pipeline and a gas temperature) and various corrosion media.

3 Claims, 1 Drawing Sheet

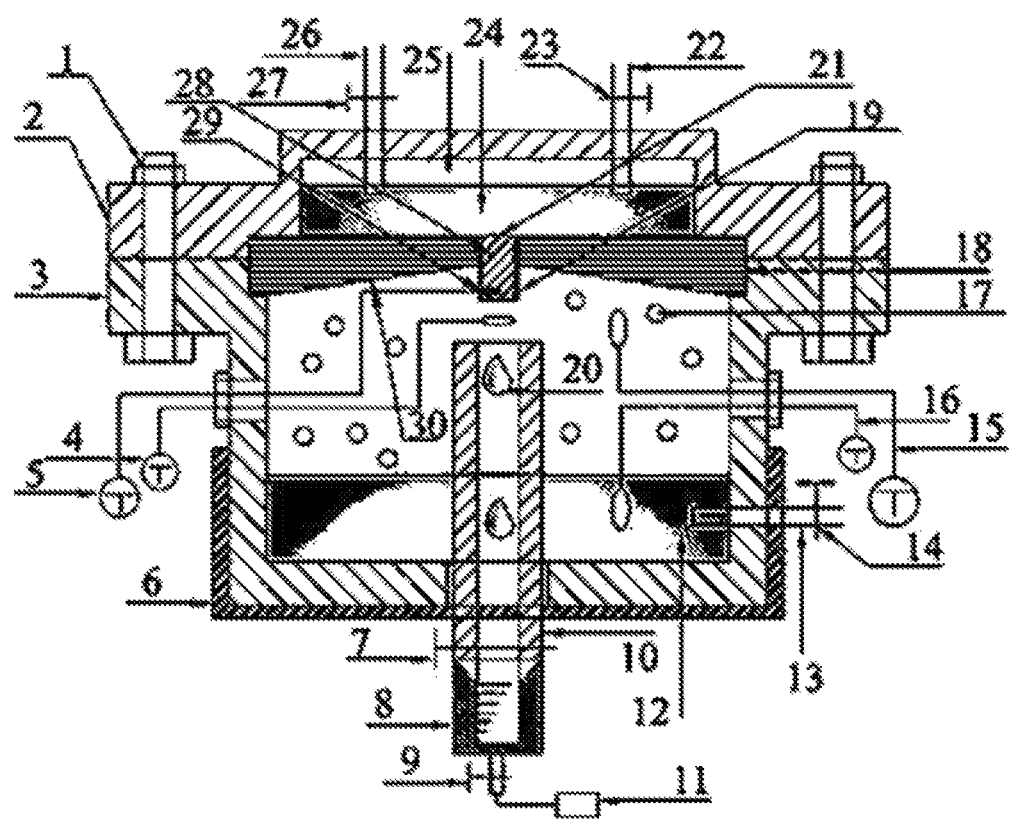

TEST DEVICE AND METHOD FOR TOP-OF-THE-LINE CORROSION OF HIGH-TEMPERATURE HIGH-PRESSURE WET GAS PIPELINE

TECHNICAL FIELD

The present invention relates to the technical field of measurement and characterization of top-of-the-line corrosion (TLC) of a wet gas pipeline, and in particular, to a test device and method for TLC of a high-temperature high-pressure wet gas pipeline.

BACKGROUND

In the process of wet gas transmission, as the temperature of a pipe wall is lower than the temperature of natural gas, water in wet gas and active mediums (such as $CO_2$ and $H_2S$) condense on an upper part of an inner wall of a pipe, causing corrosion, which is called top-of-the-line corrosion (TLC). A corrosion inhibitor is added to the wet gas pipeline for a long time, and due to the protection of the corrosion inhibitor, the bottom of the entire wet gas pipeline is basically protected from corrosion. However, the top of the pipeline is severely corroded. Therefore, testing and studying TLC and main controlling factors thereof is a key technique to prevent TLC.

In order to prevent TLC, factors influencing TLC need to be clarified. Studies have shown that: a surface temperature of the top of the pipeline, a retention time and a condensation rate of condensed water, a real-time dynamic corrosion rate, a total corrosion rate, a formation rate of a corrosion product film, an organic acid, a ratio of $H_2S/CO_2$, etc have an effect on TLC of a wet gas pipeline. Among them, the surface temperature of the top of the pipeline, the retention time and the condensation rate of condensed water and the real-time dynamic corrosion rate are the most influential and relevant factors. In view of the above problems, domestic and foreign scholars mainly use a conventional weight loss method to study TLC of wet gas pipelines. However, this method can only obtain a total corrosion rate of a top surface of a wet gas pipeline exposed to a corrosive medium. During the test, due to the combined effect of corrosion and a corrosion product film, the total corrosion rate cannot reflect the dynamic change process of the corrosion on the top surface of the wet gas pipeline. Therefore, to truly understand the influence rule of corrosion and the formation of the corrosion product film on the TLC, the dynamic corrosion rate and chemical composition of condensed water must be monitored in real time.

At present, in China, there is not a test device or method that can both simulate a high-temperature high-pressure TLC environment and accurately obtain the retention time and condensation rate of condensed water, the real-time dynamic corrosion rate, and the formation rate of the corrosion product film. Therefore, the TLC cannot be systematically evaluated. To this end, the present invention provides a test device and method for TLC of a high-temperature high-pressure wet gas pipeline. The device and method can both simulate a high-temperature high-pressure TLC environment and accurately obtain the retention time and condensation rate of condensed water, the real-time dynamic corrosion rate, and the formation rate of the corrosion product film. Moreover, the device and method fully meet the service conditions of high-temperature high-pressure oil and gas transmission pipelines in China, achieve systematic evaluation of wet gas pipeline TLC, and provide theoretical support for the control of wet gas pipeline TLC.

SUMMARY

An objective of the present invention is to provide a test device and method for top-of-the-line corrosion (TLC) of a high-temperature high-pressure wet gas pipeline, to solve the technical problem that a retention time and a condensation rate of condensed water, a real-time dynamic corrosion rate, a total corrosion rate and a formation rate of a corrosion product film during the TLC process of a wet gas pipeline cannot be accurately measured in the past, and minimize equipment and experiment costs while achieving the above objective.

To achieve the above objective, the present invention adopts the following technical solution: a test device for TLC of a high-temperature high-pressure wet gas pipeline, mainly including: a bolt, a metal top cap, a metal reaction cylinder, a first thermometer, a second thermometer, a heating jacket, a first valve, a plastic transparent measuring cylinder, a second valve, a condensed water collection tube, an atomic spectrometer, a reaction medium, a gas inlet, a third valve, a third thermometer, a fourth thermometer, an acid gas, a rubber seal cover, a threaded epoxy resin, a condensate droplet, a threaded hole, a cooling water inlet, a fourth valve, a cooling water, a condensation chamber, a cooling water outlet, a fifth valve, a pipeline sample, a temperature measuring hole, and a 30-degree tilt angle. The bolt fixes the metal top cap and the rubber seal cover on the metal reaction cylinder by means of shoulder fitting; the pipeline sample is wrapped with the threaded epoxy resin, which functions for insulation and fixes the pipeline sample inside the threaded hole in the center of the rubber top cap; the top of the rubber seal cover has the 30-degree tilt angle, which serves to drain a condensate on the rubber seal cover to both ends, preventing the condensate from entering the condensed water collection tube to disturb an experimental result; the metal top cap, the rubber seal cover, the pipeline sample and the threaded epoxy resin together form the condensation chamber; during a test, the cooling water always passes through the cooling water inlet, the cooling water outlet, the fourth valve and the fifth valve to circulate in the condensation chamber to ensure that the pipeline sample in the condensation chamber maintains a temperature required for an experiment; the first thermometer is used to test the temperature of the acid gas and the temperature of the condensate droplet; the second thermometer fixed to the temperature measuring hole at the bottom of the pipeline sample is used to test the temperature of a lower surface of the pipeline sample; the third thermometer is used to measure the temperature of the acid gas; the fourth thermometer is used to measure the temperature of the reaction medium in the metal reaction cylinder; the heating jacket is used to heat the reaction medium in the metal reaction cylinder; the first valve, the second valve, the condensed water collection tube and the plastic transparent measuring cylinder are used to displace air in the metal reaction cylinder and collect the condensate droplet; the plastic transparent measuring cylinder is used to collect and measure the volume of the condensate droplet in real time; after measurement, the condensate droplet directly enters the atomic spectrometer to analyze the chemical composition of condensed water and obtain the content of $Fe^{2+}$ and a real-time dynamic corrosion rate; the gas inlet and the third valve are used to inject the acid gas such as $CO_2$.

In the present invention, the first thermometer is used to test the temperature of the acid gas and the temperature of the condensed water. During the test, the temperature of the first thermometer will dynamically change. A temperature-time curve can be obtained through the dynamic recording of a sensor. In the curve, high temperature represents the temperature of the acid gas, and low temperature represents the temperature of the condensate droplet. A time interval between two lowest adjacent points is an interval between first and second drops of condensed water on an inner surface of the pipeline sample. The interval is also a retention time of the condensed water on the inner surface of the pipeline sample.

In the present invention, the temperature of the acid gas is controlled by the temperature of the reaction medium in the metal reaction cylinder, and the temperature of the lower surface of the pipeline sample is controlled by the circulating cooling water in the condensation chamber.

Compared with the prior art, the present invention has the following advantages.

(1) The test device can effectively simulate TLC of a wet gas pipeline under a high-temperature high-pressure environment. The test device can test the high-temperature high-pressure TLC of the wet gas pipeline under different temperature differences (between a surface temperature of the pipeline and a gas temperature) and various corrosion media. The test device can accurately obtain a retention time and a condensation rate of condensed water, a real-time dynamic corrosion rate, a total corrosion rate, and a formation rate of a corrosion product film during the TLC process. Therefore, the test device can comprehensively reflect the TLC, and provide theoretical support for the control of TLC.

(2) The device has a simple structure, convenient operation, low cost, and the test results can systematically evaluate TLC.

BRIEF DESCRIPTION OF THE DRAWINGS

FIG. 1 is a schematic diagram of a test device for TLC.

DETAILED DESCRIPTION

The present invention is described in detail below with reference to the accompanying drawing.

As shown in the accompanying drawing, the present invention provides a test device for top-of-the-line corrosion (TLC) of a high-temperature high-pressure wet gas pipeline, the device mainly including: a bolt 1, a metal top cap 2, a metal reaction cylinder 3, a first thermometer 4, a second thermometer 5, a heating jacket 6, a first valve 7, a plastic transparent measuring cylinder 8, a second valve 9, a condensed water collection tube 10, an atomic spectrometer 11, a reaction medium 12, a gas inlet 13, a third valve 14, a third thermometer 15, a fourth thermometer 16, an acid gas 17, a rubber seal cover 18, a threaded epoxy resin 19, a condensate droplet 20, a threaded hole 21, a cooling water inlet 22, a fourth valve 23, a cooling water 24, a condensation chamber 25, a cooling water outlet 26, a fifth valve 27, a pipeline sample 28, a temperature measuring hole 29, and a 30-degree tilt angle 30. The bolt 1 fixes the metal top cap 2 and the rubber seal cover 18 on the metal reaction cylinder 3 by means of shoulder fitting; the pipeline sample 28 is wrapped with the threaded epoxy resin 18, which functions for insulation and fixes the pipeline sample 28 inside the threaded hole 21 in the center of the rubber top cap 18; the top of the rubber seal cover 18 has the 30-degree tilt angle 30, which serves to drain a condensate on the rubber seal cover 18 to both ends, preventing the condensate from entering the condensed water collection tube 10 to disturb an experimental result; the metal top cap 2, the rubber seal cover 18, the pipeline sample 28 and the threaded epoxy resin 19 together form the condensation chamber 25; during a test, the cooling water 24 always passes through the cooling water inlet 22, the cooling water outlet 26, the fourth valve 23 and the fifth valve 27 to circulate in the condensation chamber 25 to ensure that the pipeline sample 28 in the condensation chamber 25 maintains a temperature required for an experiment; the first thermometer 4 is used to test the temperature of the acid gas 17 and the temperature of the condensate droplet 20; the second thermometer 5 fixed to the temperature measuring hole 29 at the bottom of the pipeline sample 28 is used to test the temperature of a lower surface of the pipeline sample 28; the third thermometer 15 is used to measure the temperature of the acid gas 17; the fourth thermometer 16 is used to measure the temperature of the reaction medium 12 in the metal reaction cylinder 3; the heating jacket 6 is used to heat the reaction medium 12 in the metal reaction cylinder 3; the first valve 7, the second valve 9, the condensed water collection tube 10 and the plastic transparent measuring cylinder 8 are used to displace air in the metal reaction cylinder 3 and collect the condensate droplet 20; the plastic transparent measuring cylinder 8 is used to collect and measure the volume of the condensate droplet 20 in real time; after measurement, the condensate droplet 20 directly enters the atomic spectrometer 11 to analyze the chemical composition of condensed water and obtain the content of $Fe^{2+}$ and a real-time dynamic corrosion rate; the gas inlet 13 and the third valve 14 are used to inject the acid gas 17 such as $CO_2$.

In the present invention, the first thermometer 4 is used to test the temperature of the acid gas 17 and the temperature of the condensate droplet 20. During the test, the temperature of the first thermometer 4 will dynamically change. A temperature-time curve can be obtained through the dynamic recording of a sensor. In the curve, high temperature represents the temperature of the acid gas 17, and low temperature represents the temperature of the condensate droplet 20. A time interval between the lowest temperature and two adjacent points is an interval between first and second drops of condensed water on an inner surface of the pipeline sample 28. The interval is also a retention time of the condensed water on the inner surface of the pipeline sample 28.

In the present invention, the temperature of the acid gas 17 is controlled by the temperature of the reaction medium 12 in the metal reaction cylinder 3, and the temperature of the lower surface of the pipeline sample 28 is controlled by the circulating cooling water 24 in the condensation chamber 25.

To make the objectives, technical solutions, and advantages of the present invention clearer, the specific implementations of the present invention are described below with reference to the accompanying drawing 1. The specific steps are as follows:

Step 1: install an entire test device; open a first valve 7, a second valve 9 and a third valve 14, and inject $CO_2$ into a metal reaction cylinder 3 through a gas inlet 13 to drain air in the metal reaction cylinder 3 and in a reaction medium 12.

Step 2: close the second valve 9; use a heating jacket 6 to heat the reaction medium 12 in the metal reaction cylinder 3 to an experimental set temperature; inject an acid gas 17 such as $CO_2$ into the metal reaction cylinder 3 through the gas inlet 13 to an experimental set pressure; open a cooling water inlet 22 and a cooling water outlet 26, and start the circulation of cooling water.

Step 3: test a temperature $T_1$ of a lower surface of a pipeline sample 28 by a second thermometer 5, test a temperature $T_2$ of the free acid gas 17 in the metal reaction cylinder 3 by a third thermometer 15, and test a temperature $T_2$ of the free acid gas 17 and a temperature $T_3$ of a condensate droplet 20 by a first thermometer 4. When no condensate droplet 20 falls on the lower surface of the pipeline sample 28, the first thermometer shows the temperature of the free acid gas 17, and when a condensate droplet 20 falls, the first thermometer shows the temperature of the condensate droplet 20. A temperature-time curve can be obtained through the dynamic recording of a sensor. In the curve, high temperature represents the temperature of the acid gas 17, and low temperature represents the temperature of the condensate droplet 20. A time interval between two adjacent points with the lowest temperature is an interval between first and second drops of condensed water on an inner surface of the pipeline sample 28. The interval is also a retention time of the condensed water on the inner surface of the pipeline sample 28.

Step 4: when the temperature $T_1$ on the lower surface of the pipeline sample 28 and the temperature $T_2$ of the free acid gas 17 in the metal reaction cylinder 3 reach the experimental set temperature, start an experiment, and use the sensor to start the dynamic recording of time and temperature.

Step 5: when 6-8 ml of condensed water is collected in a plastic transparent measuring cylinder 8, close the first valve 7, and accurately read the volume of the condensed water in the plastic transparent measuring cylinder 8 so as to calculate a mass $M_1$ of the condensed water; calculate a condensation rate of the condensed water by a time $t_1$ dynamically recorded by a temperature sensor, that is $C_{V11}=M_1/At_1$.

Step 6: open the second valve 9, and directly transfer the condensed water in the plastic transparent measuring cylinder 8 to an atomic spectrometer 11 to analyze the chemical composition of the condensed water and the concentration of $Fe^{2+}$; obtain a mass $M_{21}$ of the dissolved Fe based on the volume of the condensed water in the plastic transparent measuring cylinder 8; calculate a real-time dynamic corrosion rate by a time $t_1$ dynamically recorded by the sensor, that is, $C_{V21}=M_{21}/(\rho At_1)$, where $\rho$ and A are a density and an exposed area of the pipeline sample, respectively.

Step 7: analyze the temperature-time curve dynamically recorded by the first thermometer 4; read the time interval between the two adjacent points with the lowest temperature to obtain a retention time $t_{21}$ of each drop of condensed water on the inner surface of the pipeline sample 28.

Step 8: repeat step 5 to step 8 to obtain a mass $M_{22}$ of the dissolved Fe of the condensed water in the plastic transparent measuring cylinder 8 in a second time $t_1$, as well as a condensation rate $C_{V12}$ of the condensed water, a real-time dynamic corrosion rate $C_{V22}$, and a retention time $t_{22}$ of each drop of condensed water on the inner surface of the pipeline sample 28, where the steps can be deduced by analog, and will be not repeated herein again.

Step 9: clean and weigh the pipeline sample 28 after the experiment; calculate a mass difference $M_3$ of the pipeline sample 28 before and after the experiment; calculate a total corrosion rate based on a total time $2t_1$ dynamically recorded by the sensor, that is, $C_{V3}=M_3/(2\rho At_1)$.

Step 10: form a layer of corrosion product film on an inner wall surface of the pipeline sample 28, and calculate a formation rate of the corrosion product film by subtracting a total mass $M_{21}+M_{22}$ of the dissolved Fe of the condensed water in the plastic transparent measuring cylinder 8 from the mass difference $M_3$ of the pipeline sample 28 before and after the experiment, and then dividing by the total time $2t_1$ dynamically recorded by the sensor, that is, $C_{V4}=[M_3-(M_{21}+M_{22})]/(2At_1)$.

What is claimed is:

1. A test device for top-of-the-line corrosion (TLC) of a high-temperature high-pressure wet gas pipeline, wherein the device comprises: a metal top cap, a metal reaction cylinder, a first thermometer, a second thermometer, a plastic transparent measuring cylinder, a condensed water collection tube, an atomic spectrometer, a third thermometer, a rubber seal cover, a threaded epoxy resin, a condensate droplet, a threaded hole, a condensation chamber, a pipeline sample, a temperature measuring hole, and a 30-degree tilt angle; a bolt fixes the metal top cap and the rubber seal cover on the metal reaction cylinder by means of shoulder fitting; the pipeline sample is wrapped with the threaded epoxy resin, which functions for insulation and fixes the pipeline sample inside the threaded hole in the center of the rubber seal cover; the top of the rubber seal cover has the 30-degree tilt angle, which serves to drain a condensate on the rubber seal cover to both ends, preventing the condensate from entering the condensed water collection tube; the metal top cap, the rubber seal cover, the pipeline sample and the threaded epoxy resin together form the condensation chamber; during a test, cooling water always passes through a cooling water inlet, a cooling water outlet, a fourth valve and a fifth valve to circulate in the condensation chamber to ensure that the pipeline sample in the condensation chamber maintains a temperature required for an experiment; the first thermometer is used to test the temperature of an acid gas and the temperature of the condensate droplet; the second thermometer fixed to the temperature measuring hole at the bottom of the pipeline sample is used to test the temperature of a lower surface of the pipeline sample; the third thermometer is used to measure the temperature of the acid gas; the fourth thermometer is used to measure the temperature of a reaction medium in the metal reaction cylinder; a heating jacket is used to heat the reaction medium in the metal reaction cylinder; a first valve, a second valve, the condensed water collection tube and the plastic transparent measuring cylinder are used to displace air in the metal reaction cylinder and collect the condensate droplet; the plastic transparent measuring cylinder is used to collect and measure the volume of the condensate droplet in real time; after measurement, the condensate droplet directly enters the atomic spectrometer to analyze the chemical composition of condensed water and obtain the content of Fe2+ and a real-time dynamic corrosion rate; a gas inlet and a third valve are used to inject the acid gas.

2. The test device for TLC of a high-temperature high-pressure wet gas pipeline according to claim 1, wherein the first thermometer is used to test the temperature of the acid gas and the temperature of the condensate droplet; during the test, the temperature of the first thermometer will dynamically change; a temperature-time curve can be obtained through the dynamic recording of a sensor; in the curve, high temperature represents the temperature of the acid gas, and low temperature represents the temperature of the condensate droplet; a time interval between two adjacent points with the lowest temperature is an interval between first and second drops of condensed water on an inner surface of the pipeline sample; the interval is also a retention time of the condensed water on the inner surface of the pipeline sample.

3. A test method for top-of-the-line corrosion (TLC) of a high-temperature high-pressure wet gas pipeline, wherein the test method for TLC of a high-temperature high-pressure wet gas pipeline comprises the following steps:

a, installing an entire test device; opening a first valve, a second valve and a third valve, and injecting CO2 into a metal reaction cylinder through a gas inlet to drain air in the metal reaction cylinder and in a reaction medium;

b, closing the second valve; using a heating jacket to heat the reaction medium in the metal reaction cylinder to an experimental set temperature; injecting an acid gas into the metal reaction cylinder through the gas inlet to an experimental set pressure; opening a cooling water inlet and a cooling water outlet, and starting the circulation of cooling water;

c, testing a temperature T1 of a lower surface of a pipeline sample by a second thermometer, testing a temperature T2 of the free acid gas in the metal reaction cylinder 3 by a third thermometer, and testing a temperature T2 of the free acid gas and a temperature T3 of a condensate droplet by a first thermometer, wherein when no condensate droplet falls on the lower surface of the pipeline sample, the first thermometer shows the temperature of the free acid gas, and when a condensate droplet falls, the first thermometer shows the temperature of the condensate droplet; a temperature-time curve can be obtained through the dynamic recording of a sensor; in the curve, high temperature represents the temperature of the acid gas, and low temperature represents the temperature of the condensate droplet; a time interval between two adjacent points with the lowest temperature is an interval between first and second drops of condensed water on an inner surface of the pipeline sample; the interval is also a retention time of the condensed water on the inner surface of the pipeline sample;

d, when the temperature T1 on the lower surface of the pipeline sample and the temperature T2 of the free acid gas in the metal reaction cylinder reach the experimental set temperature, starting an experiment, and using the sensor to start the dynamic recording of time and temperature;

e, when 6-8 ml of condensed water is collected in a plastic transparent measuring cylinder, closing the first valve, and accurately reading the volume of the condensed water in the plastic transparent measuring cylinder so as to calculate a mass M1 of the condensed water; calculating a condensation rate of the condensed water by a time t1 dynamically recorded by a temperature sensor, that is, $CV11=M1/(At1)$;

f, opening the second valve, and directly transferring the condensed water in the plastic transparent measuring cylinder to an atomic spectrometer to analyze the chemical composition of the condensed water and the concentration of Fe2+; obtaining a mass M21 of the dissolved Fe based on the volume of the condensed water in the plastic transparent measuring cylinder; calculating a real-time dynamic corrosion rate by a time t1 dynamically recorded by the sensor, that is, $CV21=M21/(\rho At1)$, wherein $\rho$ and A are a density and an exposed area of the pipeline sample, respectively;

e, analyzing the temperature-time curve dynamically recorded by the first thermometer; reading the time interval between the two adjacent points with the lowest temperature to obtain a retention time t21 of each drop of condensed water on the inner surface of the pipeline sample;

f, repeating step 5 to step 8 to obtain a mass M22 of the dissolved Fe of the condensed water in the plastic transparent measuring cylinder in a second time t1, as well as a condensation rate CV12 of the condensed water, a real-time dynamic corrosion rate CV22, and a retention time t22 of each drop of condensed water on the inner surface of the pipeline sample, wherein the steps can be deduced by analog, and will not be repeated herein again;

g, cleaning and weighing the pipeline sample after the experiment; calculating a mass difference M3 of the pipeline sample before and after the experiment; calculating a total corrosion rate based on a total time 2t1 dynamically recorded by the sensor, that is, $CV3=M3/(2\rho At1)$; and h, forming a layer of corrosion product film on an inner wall surface of the pipeline sample, and calculating a formation rate of the corrosion product film by subtracting a total mass M21+M22 of the dissolved Fe of the condensed water in the plastic transparent measuring cylinder from the mass difference M3 of the pipeline sample before and after the experiment, and then dividing by the total time 2t1 dynamically recorded by the sensor, that is, $CV4=[M3-(M21+M22)]/(2At1)$.

* * * * *